June 8, 1926.
G. H. WHEARY
TRUNK LOCKING DEVICE
Filed August 6, 1924
1,588,073
3 Sheets-Sheet 1
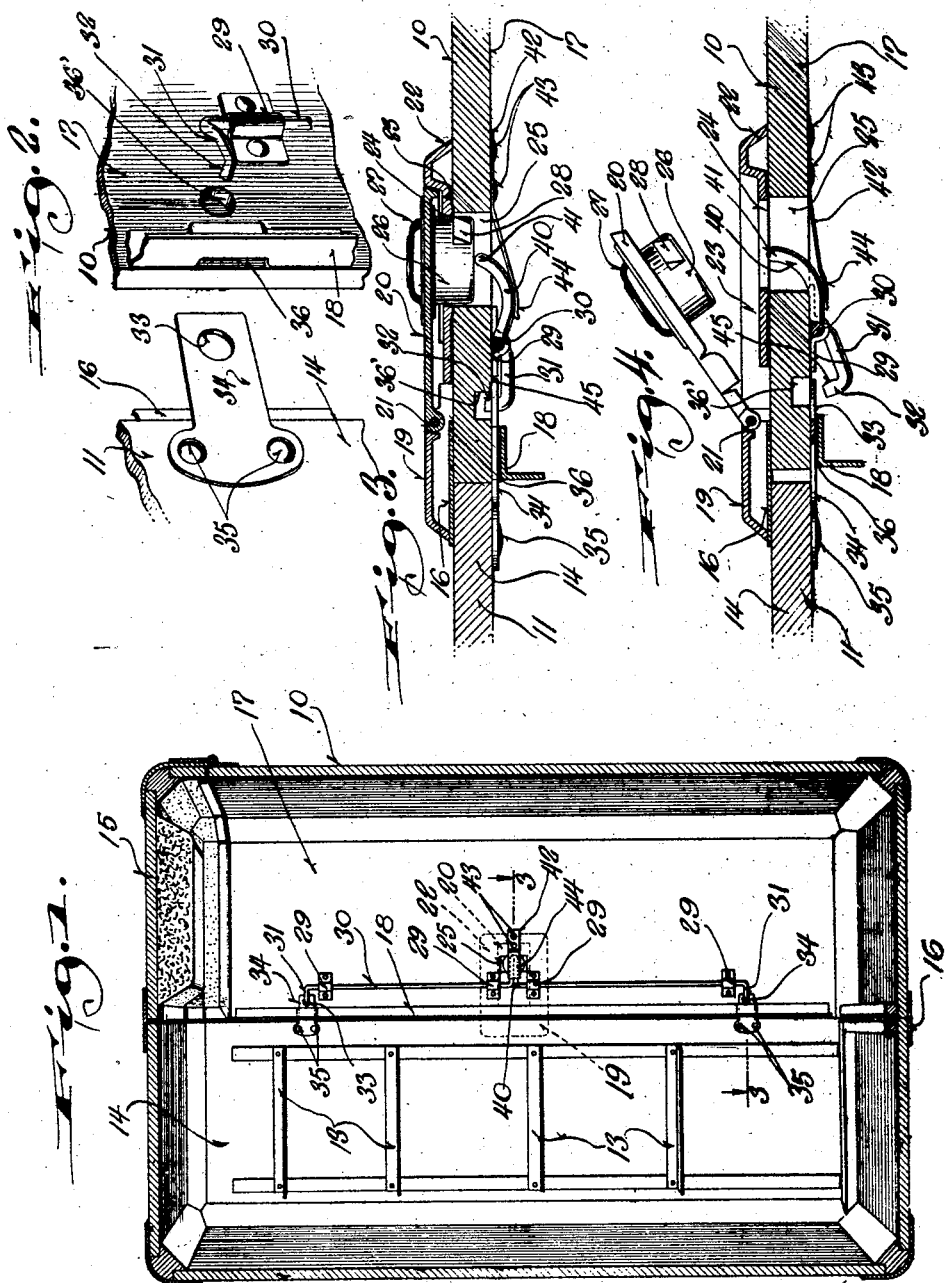
Inventor,
George Henry Wheary
By Ira M. Jones.
Attorneys.

June 8, 1926.
G. H. WHEARY
TRUNK LOCKING DEVICE
Filed August 6, 1924    3 Sheets-Sheet 2
1,588,073
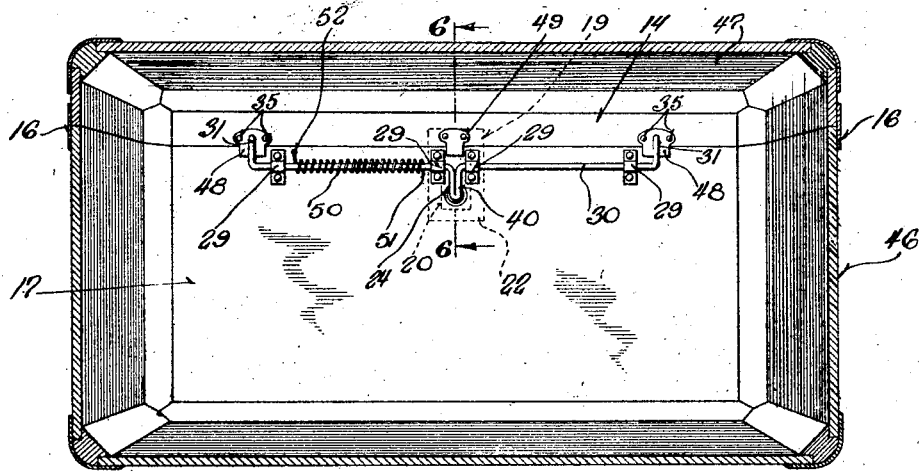
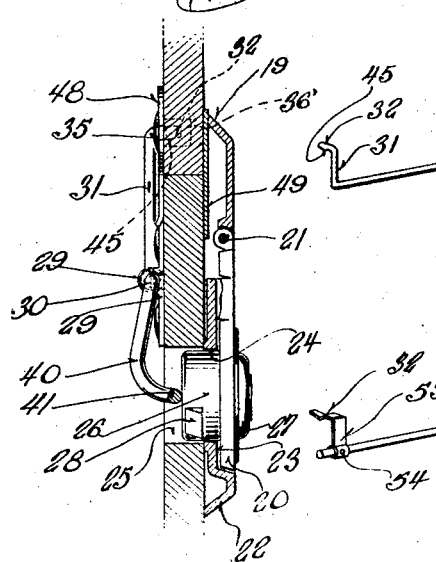
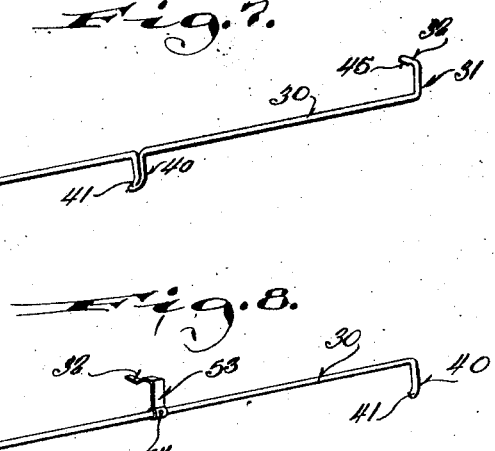
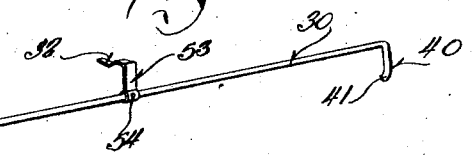
Inventor,
George Henry Wheary
By Ira W. Jones
Attorneys June 8, 1926.
G. H. WHEARY
1,588,073
TRUNK LOCKING DEVICE
Filed August 6, 1924　　3 Sheets-Sheet 3
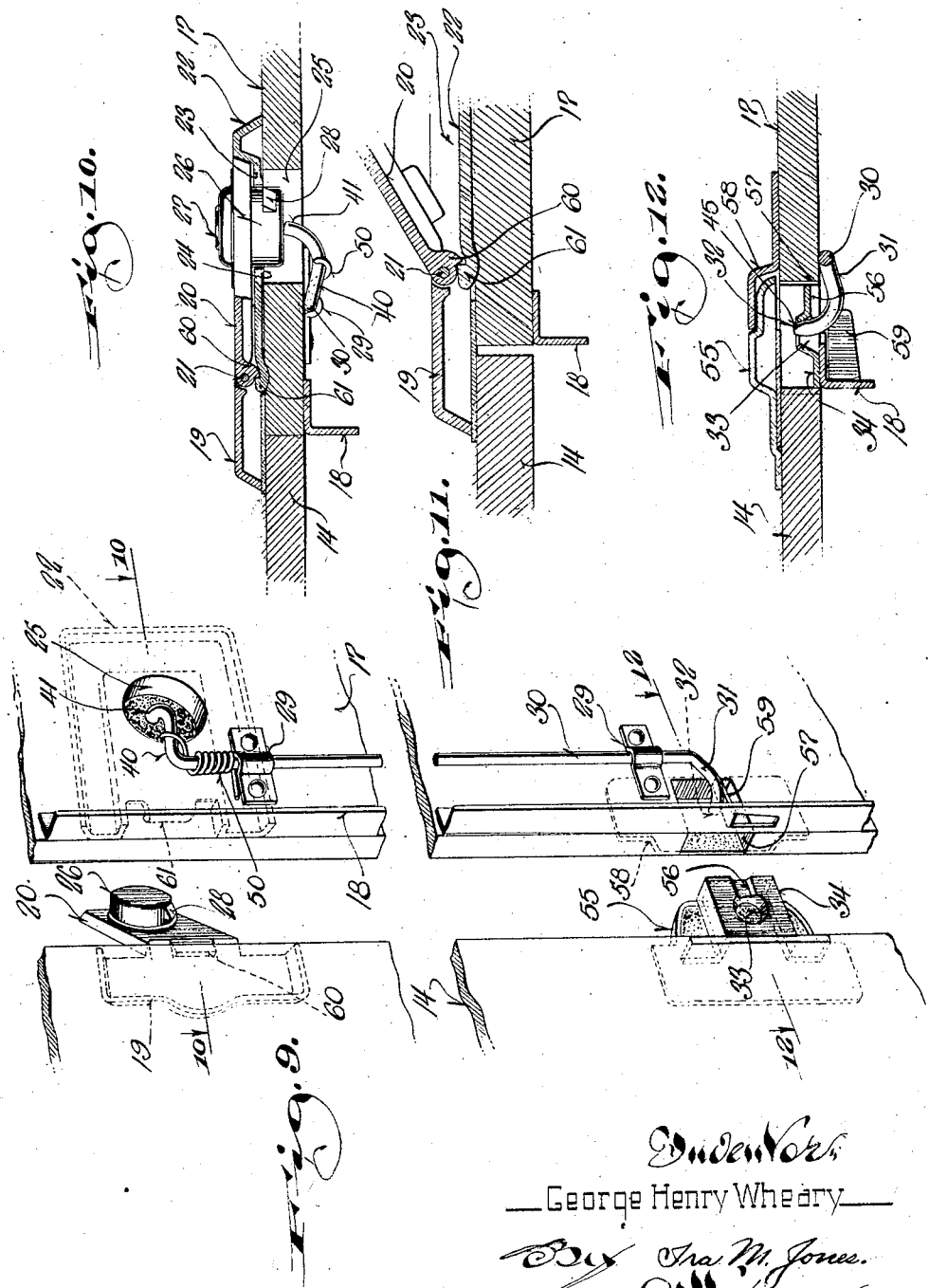
Inventor,
George Henry Wheary
By Ira M. Jones.

Patented June 8, 1926.

1,588,073

UNITED STATES PATENT OFFICE.

GEORGE HENRY WHEARY, OF RACINE, WISCONSIN, ASSIGNOR TO WHEARY TRUNK COMPANY, OF RACINE, WISCONSIN, A CORPORATION OF WISCONSIN.

TRUNK-LOCKING DEVICE.

Application filed August 6, 1924. Serial No. 730,524.

This invention relates to certain new and useful improvements in trunk locking devices and has as one of its objects the provision of means operable to secure the trunk in closed position in different places upon locking movement of a master lock.

It is another object of this invention to provide a locking device having a master lock element controlling means for actuating another locking element to rigidly and substantially secure the sections of the trunk or other device in closed position against tampering or unauthorized opening.

In wardrobe and other trunks it is customary to provide a key controlled master lock and draw-bolts or auxiliary locking elements positioned in spaced relation with respect to the master lock to prevent spreading of the trunk parts when subjected to twisting stresses and this invention has as another of its objects the provision of means operable upon locking movement of the master lock to actuate auxiliary locking elements.

It is a further object of this invention to provide means cooperating with the master lock to firmly secure the trunk parts against unauthorized opening which means are concealed within the trunk.

And a still further object of this invention resides in the provision of a trunk locking device of the character described which is of substantial and rigid construction and which will in nowise mar the appearance of the trunk.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a perspective sectional view taken vertically through a wardrobe trunk equipped with my improved locking device, the sections of the trunk being illustrated in closed position;

Figure 2 is a fragmentary perspective view illustrating one of the auxiliary locking means actuated from the master lock with the sections of the trunk in partly opened positions;

Figure 3 is an enlarged fragmentary view, partly in section and partly in elevation, taken through Figure 1 on the plane of the line 3—3 and illustrating the device in locked position;

Figure 4 is a view substantially similar to Figure 3 illustrating the locking device in opened position with the trunk sections slightly ajar;

Figure 5 is a view similar to Figure 1 illustrating the application of my invention to a style of trunk other than one of the wardrobe type;

Figure 6 is a view, partly in section and partly in elevation, taken through Figure 5 on the plane of the line 6—6;

Figure 7 is a perspective view of one of the auxiliary locking mechanism bars detached from the trunk;

Figure 8 is a view similar to Figure 7 of a slightly modified structure of locking bar;

Figure 9 is a fragmentary view somewhat similar to Figure 2 illustrating another modified form of my invention;

Figure 10 is a view, partly in section and partly in elevation, taken through Figure 9 on the plane of the line 10—10;

Figure 11 is a fragmentary view similar to Figure 10 and illustrating the closing movement of the master lock, and Figure 12 is a fragmentary view, partly in section and partly in elevation, taken transversely through Figure 9 on the plane of the line 12—12.

Referring now to the accompanying drawings, and more particularly to Figures 1 to 4, inclusive, the numeral 10 designates the wardrobe section or compartment of a wardrobe trunk, and 11 the drawer section or compartment in which a plurality of drawers, not shown, are slidably mounted on guide members 13 suitably secured to the opposite side walls or panels 14 of the section. The wardrobe section may or may not be provided with a hinged top 15 and the drawer section is provided with a valance strap 16 extending therearound along its marginal edge to overlie the marginal edge of the wardrobe section when closed. Secured to the inner face of each side panel 17 of the wardrobe section and adjacent the marginal edge thereof is an angle iron member 18 which serves as an abutment or stop for the outer edges of the drawers, not shown, when the trunk is closed in the ordinary manner.

The trunk sections are hingedly connected and adapted to be locked in closed position by a hasp lock comprising a plate 19 secured to the outer panel of one section adjacent its marginal edge, being illustrated in the present embodiment as the panel of the drawer section, and having the inner end of a hasp 20 secured thereto by a pivot pin 21. The plate 19 preferably projects beyond the edge of the panel 14 to overlie the panel 17 of the other section and abut a keeper plate 22 secured thereto, see Figures 3 and 4.

The plate 22 is preferably provided with an elongated recess or pocket 23 of a shape to receive the hasp member 20 and the outer end of the pocket or recess 23 has an opening or aperture 24 therein registering with an aperture or opening 25 in the panel 17 into which the barrel 26 of a lock device 27 carried by the outer free end of the hasp member is engageable. The locking device includes one or more spring pressed bolts 28 adapted to be engaged behind the peripheral edge of the keeper plate surrounding the aperture 24 and may be similar to that illustrated in my copending application Serial Number 698,666, although it is expressly understood that any type of master lock may be employed.

Rotatably, but non-longitudinally movably, secured to the side panel of the trunk section carrying the keeper plate 22 by straps or bearing members 29, is a locking bar or rod member 30, the ends of which are struck laterally, as at 31, with the extreme ends directed inwardly to provide locking elements or lugs 32. Each locking element or lug 32 is adapted to be engaged in an opening or recess 33 in a plate or keeper 34 secured to the panel 14 by fastening means 35 and adapted to be passed through a guide-way or opening 36 formed between the adjacent angle member 18 and the panel 17 by striking the same inwardly.

The panel 17 is provided with recesses 36' with which the openings 33 of the keeper plates 34 register when the trunk sections are closed and into which the locking elements or lugs pass when the rod 30 is rotated to move the ends 31 thereof toward the panel.

At a point in line with the opening 25, the rod or bar 30 has an actuating finger or arm 40 which projects laterally from the bar 30 in a direction opposite to that of the ends 31 and is curved inwardly to normally position its extreme end 41 in the opening 24 of the plate 22 in the path of the barrel 26 to be engaged by the inner face thereof upon locking or closing movement of the hasp 20. Engagement of the barrel 26 with the actuating finger 40 rotates the rod 30 in a clockwise direction, with respect to Figures 3 and 4, moving the locking elements or lugs 32 into the aligned openings 33 and 36'.

The bar 30 is yieldably urged in a direction to position the elements or lugs 32 free of the recesses 36' and out of the path of the plates 34 by a spring member 42, one end of which is secured to the panel 17 by fastenings 43 and the free end 44 of which bears against the actuating finger or arm 40. As best illustrated in Figures 3 and 4, the locking elements or lugs are slightly tapered, as at 45, to insure their movement into the openings of the plates 34 in the event the trunk sections are not fully closed.

In Figures 5 and 6, I have illustrated the application of my invention to the conventional type of trunk comprising a box 46 having a lid or top 47 which is hingedly connected therewith by means, not shown. My improved locking device is secured to the outer panels 14 and 17 thereof in a manner substantially identical to that described in connection with the wardrobe type of trunk and, consequently the description applied to Figures 1 to 4, inclusive will be applied to Figures 5 and 6.

In this form of my invention, however, the apertures or openings 33 of the plates 34 are in that portion of the plate secured to the panel 14 and the openings 36' are, consequently, formed in panel 14, the outer ends 48 of the keeper plates overlying the panel 17 of the box 46 to prevent forcing inwardly of the panel 17 by anyone attempting to gain unauthorized admission to the trunk. A plate 49 is also secured to the trunk top panel 14 and overlies the panel 17 of the trunk box 46 adjacent the master lock to prevent forcing inwardly thereof.

The flat spring member 40 may be eliminated and in its place a coil spring 50 wound about the bar 30 with one end 51 secured thereto by being passed through an opening therein, not shown, and its other end 52 secured to the panel 17. The torsion of the spring is such as to normally tend to move the actuating finger into the path of the barrel 26 of the locking mechanism carried by the hasp 20.

As will be readily obvious to those skilled in the art to which an invention of this character appertains, the master lock may be positioned adjacent one end of the trunk instead of a medial point as illustrated, in which case the actuating finger or arm 40 is positioned at the end of the bar 30 and the locking elements or lugs 32 are carried one by the other end of the locking bar and another by the medial portion thereof.

In Figures 1 to 7, inclusive, the locking bar is illustrated as formed from a single length of material bent to form and as will be readily obvious the structure may be formed in various manners, one additional form being illustrated in Figure 8 wherein the actuating finger or arm 40 is bent on one end of the bar 30 and the locking elements or lugs 32 carried by metal members 53 secured to the bar 30 by pins or other means 54.

In the modification illustrated in Figures 9 to 12, inclusive, but one locking element or lug 32 is formed on the rod member or locking bar 30 and that on the lower end thereof. The actuating finger 40 is formed on the upper end with its extreme end 41 normally yieldably urged into the opening 25 to be engaged by the lock barrel 26, as previously described, by the spring 50 coiled about the upper end of the rod member 30, as illustrated in Figure 9.

In this form of my invention, the plate or keeper 34 is in the form of a lug concealed behind one member 55 of a dowel fitting and has the opening or recess 33 thereof tapered and from which a guide channel or groove 56 leads to its outer end. The lug or plate 34 in the closing of the trunk passes into a recess or opening 57 in the edge of the adjacent panel 17 which has its outer portion closed by the other member 58 of the dowel fitting. In this manner the locking elements are entirely concealed and in nowise mar the appearance of the trunk and a stronger structure is provided.

The valance strip 18 which extends along the marginal edge of the panel 17 has a tongue or lug 59 struck inwardly therefrom on which the end 31 of the rod member 30 normally rests to retain the locking lug 32 in constant alignment with the channel 56, and consequently the opening 33.

The opening 33 being channeled and the lug 32 being tapered, results in the drawing together of the trunk sections in case they are slightly ajar when the hasp 20 is moved to locking position. The trunk sections are also drawn together and the strain on the rod 30 incidental thereto is relieved to a large degree by a projection or ledge 60 formed on the inner end of the hasp 20 which engages behind a shoulder 61 formed on the plate 22 at the inner end portion of the recess 23. When the trunk sections are moved to approximately closed position, movement of the hasp member into the recess 23 causes the lug or projection 60 to bear against the shoulder 61 and consequently draw the marginal edges of the panels 14 and 17 together. Simultaneously with the drawing of the sections together, the rod 30 is rotated in the manner previously described inserting the locking element or lug 32 thereof in the tapered recess 33 thus cooperating with the shoulders 60 and 61 to draw the sections together and locking the trunk sections closed.

From the foregoing description taken in connection with the accompanying drawings, it will be readily obvious that I provide an improved locking device for trunks or other structures which will afford means for securing the trunk sections or parts in closed position against unauthorized opening or tampering, which will secure the trunk parts against opening movement due to twisting stresses incidental to the improper handling of the trunk, and one in which all the mechanism, excepting the master lock, is concealed within the interior of the trunk so that the appearance of the trunk is in nowise marred.

What I claim as my invention is:

1. A trunk composed of hinged sections adapted to be secured together by a pair of locking elements one of which is key controlled, a bar having one end portion bent and adapted to form the locking member of the other element, the other end of the bar being bent in an opposite direction and lying in the path of the key controlled element, and said bar adapted to be rocked upon the movement of the first element to locking position to cause the locking of the second element.

2. A device of the class described, comprising a main lock and a secondary lock, a rocking bar extending from one to the other, oppositely extending projections carried by said bar, one of which moves into the secondary lock to form the locking element therefor, the other adapted to be engaged by the main lock during its locking movement, and said bar adapted to rock during the locking movement of the main lock to cause the locking of the secondary lock.

3. A device of the class described, comprising a main lock and a secondary lock, a rocking member having oppositely extending projections one of which is adapted to move into the secondary lock to form the locking element therefor, the other of said projections adapted to be engaged by the main lock during its locking movement, and said rocking member adapted to be rocked during the locking movement of the main lock to cause the locking of the secondary lock.

4. A trunk composed of two sections hingedly connected and adapted to be secured together by a pair of locking members, one of which is key controlled, a rocking bar extending from one lock to the other, said bar having a pair of arms extending in opposite directions, one of said arms forming the locking element of the other lock, the other of said arms lying in the path of the key controlled lock, and said bar adapted to be rocked upon the locking movement of the key controlled lock to cause the locking of the other lock.

5. A trunk composed of two sections hingedly connected and adapted to be secured together by a plurality of locking members, one of which is key controlled, a rocking bar extending from the key controlled lock to the others, said bar having a plurality of projections, one of which extends within the locking path of the key controlled lock, the others of said projections forming the locking elements of the other locking members, and said bar adapted to be rocked upon the locking movement of the key controlled lock to cause the locking of the other locks.

6. A trunk composed of two sections hingedly connected and adapted to be secured together by a pair of locking members, one of which is a main lock and key controlled, the other of said locking members being formed by a recess carried in one section which receives therein a projection carried by the other section, a rocking bar having oppositely extending arms one of which lies within the locking path of the main lock and the other adapted to pass through said projection to form the other lock, and said bar adapted to be rocked during the locking movement of the main lock to cause the movement of the arm into said projection.

7. A trunk composed of two sections hingedly connected and adapted to be secured together by a plurality of spaced locking members, one of which is a main lock, means operable upon the locking movement of the main lock for operating the other locking members, means carried by the main lock and operable during its locking movement for drawing the two sections together, and said sections being further drawn together adjacent the other locking members during the locking movement of said members.

8. A trunk composed of two sections hingedly connected and adapted to be secured together by spaced main and secondary locks, a rocking member extending from one to the other and provided with outwardly extending projections, one of which forms the locking element of the secondary lock, the other of said projections adapted to be engaged by the main lock during its locking movement, means controlled by the locking movement of the main lock for drawing the two sections together adjacent the main lock, and said sections being further drawn together adjacent the secondary lock during its locking movement by means controlled by the main lock.

9. A trunk composed of two sections hingedly connected and adapted to be secured together by a plurality of locking members one of which is key controlled, a rocking bar extending from the key controlled lock to the others, said bar having a plurality of projections, one of which lies within the locking path of the key controlled lock, the others of said projections forming the locking elements of the other locking members, said bar adapted to rock upon the locking movement of the key controlled lock to cause the locking of the other locks, means for drawing the two sections together adjacent the key controlled lock upon the locking movement of the same, and said locking elements of the other lock members adapted to draw the sections together during their locking movement.

10. A trunk composed of two sections hingedly connected and adapted to be secured together by spaced main and secondary locks, said secondary lock being formed by a recess carried in one section which receives therein a projection carried by the other section, a tapered pocket formed within said projection, a rocking bar having oppositely extending arms one of which lies within the locking path of the main lock and the other adapted to pass through said recess and into the pocket carried by the projection to form the locking element of the secondary lock, said bar being rocked during the locking movement of the main lock to cause the movement of said arm into the pocket, means for drawing the sections together adjacent the main lock upon the locking movement of the same, and said locking element of the secondary lock tending to draw the sections together during its movement into the pocket of said projection.

In testimony whereof I affix my signature.

GEORGE HENRY WHEARY.